United States Patent
Asano et al.

[19]

[11] Patent Number: 5,956,040
[45] Date of Patent: Sep. 21, 1999

[54] SIMULATION SYSTEM USING COMPUTER GRAPHICS AND MODEL EXPRESSION METHOD IN SIMULATION SYSTEM

[75] Inventors: Takeo Asano, Kunitachi; Hiroo Iwata, Tsukuba, both of Japan

[73] Assignee: Olympus Optical Co., Ltd., Tokyo, Japan

[21] Appl. No.: 08/940,611

[22] Filed: Sep. 30, 1997

[30] Foreign Application Priority Data

Oct. 4, 1996 [JP] Japan .................................. 8-264256

[51] Int. Cl.$^6$ .................................................. G06T 17/20
[52] U.S. Cl. ........................ 345/419; 434/262; 434/267; 434/272
[58] Field of Search ............................ 364/578; 434/262, 434/267, 272

[56] References Cited

U.S. PATENT DOCUMENTS 5,766,016  6/1998  Sinclair et al. ........................ 434/262

OTHER PUBLICATIONS

Journal of Information Processing Society of Japan, Tokyo, Japan, vol. 37, No. 6, Jun. 1996, pp. 1088–1098, Eiji Kitagawa et al, Implementation of Basic Functions of Interactive Surgical Simulation System Based on Virtual Space Manipulation.

Japanese Journal of Medical Electronics and Biological Engineering (BME), Business Center for Academic Societies, Tokyo, Japan, vol. 9, No. 11, 1995, pp. 36–44, N. Suzuki et al Virtual Reality for the Operation Planning.

*Primary Examiner*—Mark R. Powell
*Assistant Examiner*—Kimbinh T. Nguyen
*Attorney, Agent, or Firm*—Frishauf, Holtz, Goodman, Langer & Chick, P.C.

[57] ABSTRACT

The numbers of nodes forming each polygon and the spatial coordinates of these nodes are stored as polygon data in a data storage unit. On the basis of this stored data, a model drawing unit expresses a model. To deform the model by using an operating tool expressed by polygons, a node formation circuit forms new nodes near a contact node to repaste polygons, thereby expressing an incised portion.

7 Claims, 5 Drawing Sheets

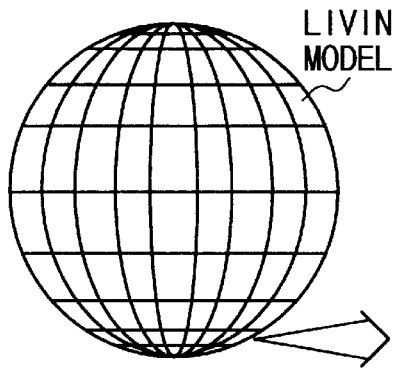
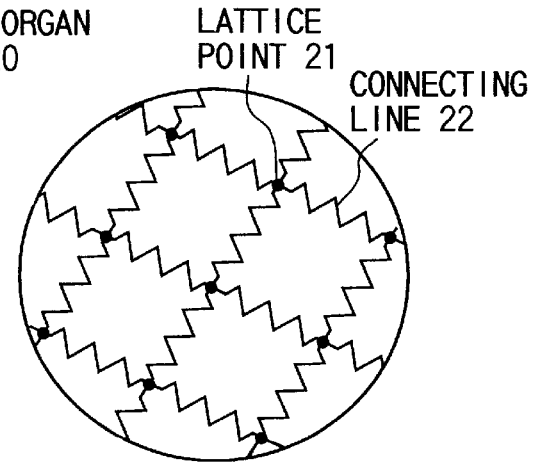
FIG. 4A  FIG. 4B
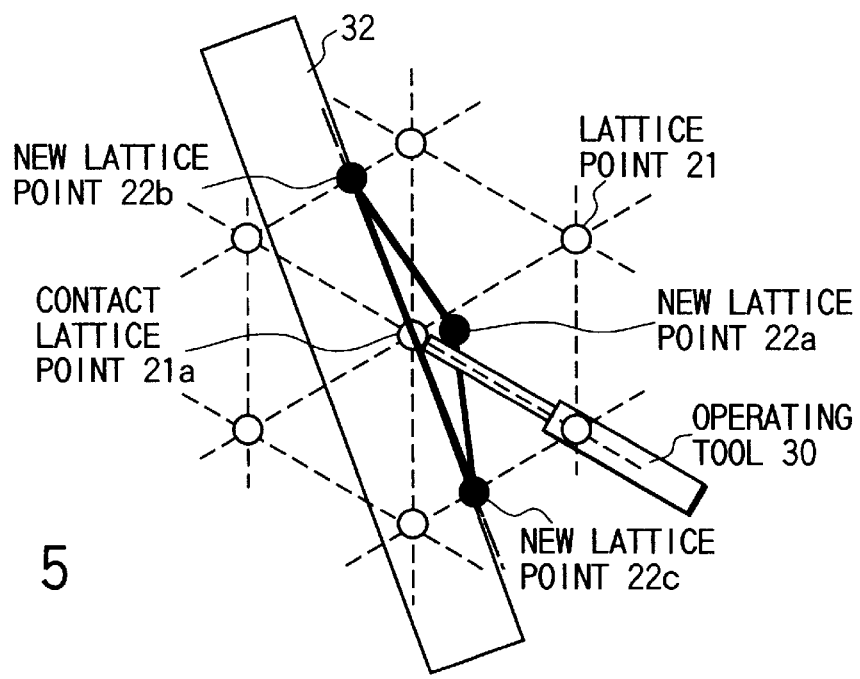
FIG. 5
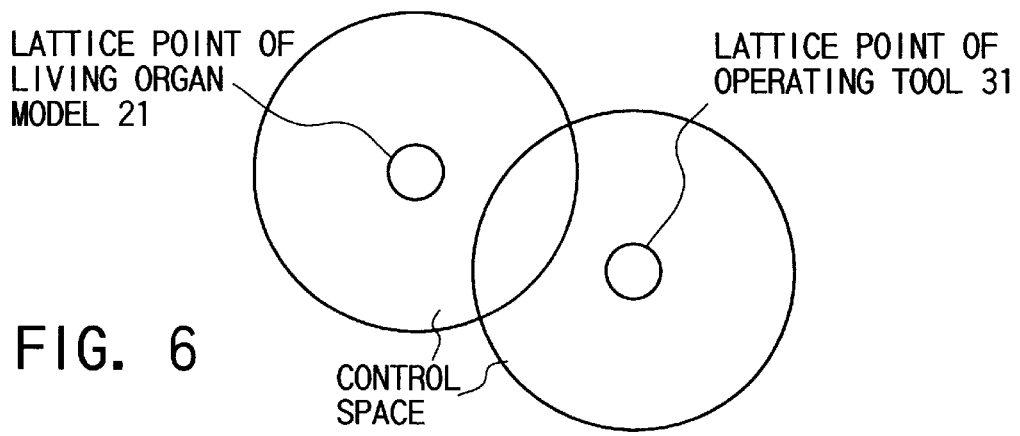
FIG. 6

SIMULATION SYSTEM USING COMPUTER GRAPHICS AND MODEL EXPRESSION METHOD IN SIMULATION SYSTEM

BACKGROUND OF THE INVENTION

The present invention relates to a simulation system using computer graphics and a model expression method in the simulation system.

Recently, simulation systems using computer graphics are being developed as educational training systems for various instrumental operations.

Such simulation systems have been first developed as control training systems for airplanes and are, at present, gradually finding use as new medical simulators in the field of medical treatment.

In the field of medical treatment, the use of a simulation system of this sort as a support system for laparoscopic surgery is being examined on the research level.

Laparoscopic surgery is a surgical technique by which insertion holes as small as about 10 mm in diameter are formed in several portions of a patient's body and a laparoscope and forceps are inserted through these insertion holes to perform all processes such as incision, extraction, and suture, similar to those performed in abdominal operations, while monitoring images through the laparoscope.

This surgical technique is not only less invasive but also less dangerous in terms of the possibility of complications after surgeries than conventional surgical techniques which scalpel a wide area of a patient's body. Accordingly, this surgical technique is being greatly expected with the recent increasing medical expenses and increasing population of advanced age in the background.

In these medical applications, making the operation or deformation of an organ model as an object in a simulation system look like the motion of an actual organ is particularly a big technical problem.

Conventionally, organ models on these simulation systems are expressed by pasting polygonal geometric planes called polygons; all polygons continue to each other to express one structural body.

In dividing a structural body such as when a new end portion is to be formed by incision, therefore, a portion which can be incised is previously determined, and polygons in that portion are not connected from the beginning. That is, these polygons are moved away from each other as an operating means which defines an incising action approaches. Alternatively, at the start of an incising action, whole model data is rewritten for an entirely new organ model, thereby drawing the new organ model.

Since, however, a conventional organ model is expressed by pasting polygons, a given portion cannot be divided by incision in the former method in which the portion that can be incised is previously determined. In the latter method of rewriting whole model data, on the other hand, an organ model is difficult to draw in real time because an enormous amount of calculations must be performed.

As described above, organ models expressed by using polygons on conventional simulation systems have already reached their limits in reproducing the reality of motion of an actual organ.

BRIEF SUMMARY OF THE INVENTION

It is, therefore, the object of the present invention to solve the above problems and provide a simulation system using computer graphics and a model expression method capable of giving reality to the deformation of a model described by using polygons.

According to the first aspect of the present invention, there is provided a simulation system based on computer graphics using a model expressed by polygons which are polygonal planes constituted by a plurality of nodes and a plurality of connecting lines for connecting the nodes, comprising: means for drawing an operating tool for performing an operation for the model; detecting means for calculating a distance between an end portion of the operating tool drawn by the drawing means and the node constituting the model and detecting that the end position of the operating tool is located within a predetermined distance; and first node generating means for receiving an output from the determining means and generating a node near a given node having a predetermined distance from the operating tool so as not to be connected to the given node.

According to the second aspect of the present invention, there is provided a model expression method based on computer graphics using a model expressed by polygons which are polygonal planes constituted by a plurality of nodes and a plurality of connecting lines for connecting the nodes, comprising: the step of drawing an operating tool for performing an operation for the model; the detecting step of calculating a distance between an end portion of the operating tool and the node constituting the model and detecting that the end position of the operating tool is located within a predetermined distance; and the first node generating step of generating a node near a given node having a predetermined distance from the operating tool so as not to be connected to the given node on the basis of a determination result in the determining step.

The method according to the second aspect, further comprises: the second node generating step of generating nodes at intersections between a polygon constituted by a plurality of nodes around the given node having the predetermined distance from the operating tool and a predetermined plane containing the end portion of the operating tool; and the connecting step of generating connecting lines for connecting the nodes generated in the second node generating step and the nodes constituting the polygon and connecting lines for connecting the nodes generated in the second node generating step and the node generated in the first node generating step.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 4A and 4B are a view showing a general idea of a living organ model drawn by computer graphics according to the embodiment of the present invention, and an enlarged view of a portion of the model, respectively;

FIG. 5 is a view for explaining a general idea of incision of the living organ model according to the embodiment of the present invention;

FIG. 6 is a view for explaining determination of contact between nodes in the embodiment of the present invention;

DETAILED DESCRIPTION OF THE INVENTION

Figure 1:
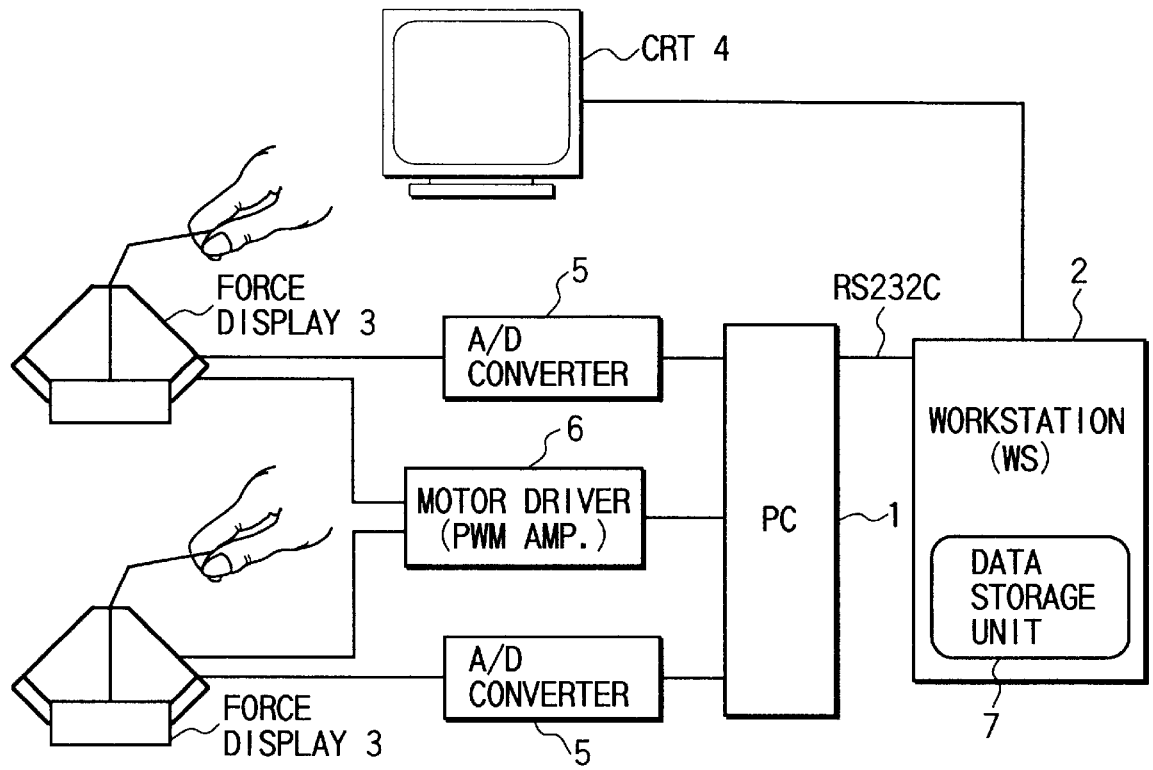
FIG. 1 is a schematic view showing the arrangement of a whole medical simulation system according to an embodiment of the present invention.

Reference will be made in detail to the presently preferred embodiments of the invention as illustrated in the accompanying drawings, in which like reference characters designate like or corresponding parts throughout the several drawings.

An embodiment of the present invention will be described below with reference to FIGS. 1 to 8.

FIG. 1 is a schematic view showing the arrangement of a whole medical simulation system according to the embodiment of the present invention.

As shown in FIG. 1, this medical simulation system according to the embodiment of the present invention comprises a personal computer (PC) 1 for controlling the entire system, a graphic workstation (WS) 2 for constructing and displaying a virtual environment, a monitor 4 such as a CRT for visually presenting the output virtual environment from the WS 2 to an operator, two 6-degree of freedom, 9-actuator parallel link force displays (6 DOF force displays) 3, for both hands, which present a counterforce from the virtual environment to the operator, AID converters 5 and a motor driver (PWM AMP.) 6 connected between the force displays 3 and the PC 1, and a data storage unit 7 in the WS 2.

DC servo motors (not shown) and potentiometers (not shown) are provided on joint shafts of the force displays 3. Potentiometer output A/D-converted by the A/D converters 5 are converted into the coordinates of the hands of the force displays 3 by the PC 1. These coordinate values are output to the WS 2 to represent the position and direction of the operating tool operated by the operator.

In presenting an arbitrary counterforce on the force displays 3, the PC 1 calculates the torque of each DC servo motor from the joint angle and instructs the motor driver 6 to drive each servo motor by a PWM method.

Communications between the WS 2 and the PC 1 are done by using RS232C.

Figure 2:
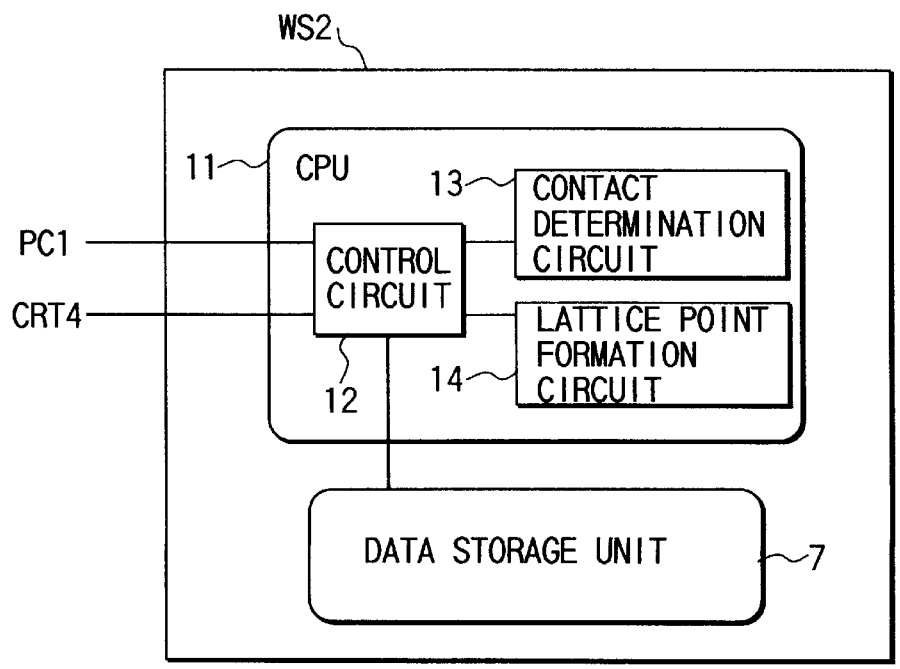
FIG. 2 is a block diagram showing the configuration of a graphic workstation 2 in FIG. 1.

FIG. 2 is a block diagram showing the configuration of the graphic workstation (WS) 2.

The WS 2 comprises a CPU 11 for controlling drawing of a model as a model drawing means and the data storage unit 7 for storing polygon data. The CPU 11 has a control circuit 12 for controlling the whole WS 2, a contact determination circuit 13, and a node formation circuit 14.

In this embodiment as described above, control, contact determination, and node formation are realized by hardware by using the internal circuits of the CPU 11. However, these functions can also be accomplished by controlling the CPU 11 by software.

Figure 3:
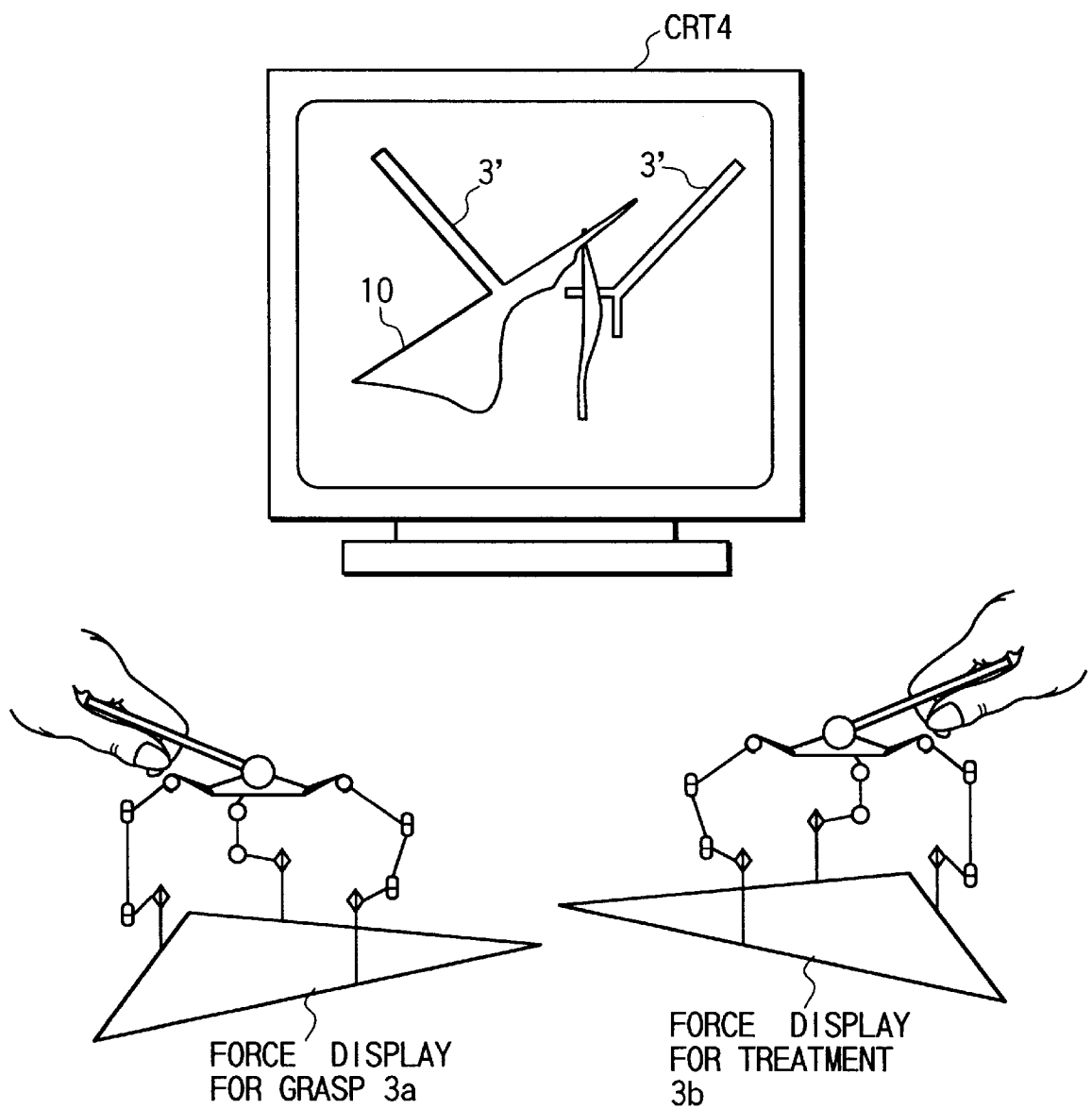
FIG. 3 is a view schematically showing an operating state of the medical simulation system according to the embodiment of the present invention.

FIG. 3 is a view schematically showing an operating state of the medical simulation system according to the embodiment of the present invention.

That is, in an actual simulation as shown in FIG. 3, an operator holds a force display 3a for treatment and a force display 3b for grasp in the left and right hands. While observing images on the monitor 4 in which a virtual space is shown, the operator operates the force displays 3a and 3b to move models 3' of the force displays 3 on the monitor 4, thereby approaching an object 10 representing a living organ model or the like.

FIGS. 4A and 4B are a view showing a general idea of a living organ model drawn by computer graphics according to the embodiment of the present invention, and an enlarged view of a portion of the model, respectively.

That is, FIGS. 4A and 4B show the object 10 represented by computer graphics by using pasting of polygons.

Reference numeral 20 denotes a living organ model indicated by polygons; 21, nodes also serving as control points for the polygons forming the living organ model; and 22, connecting lines for connecting these nodes 21.

As shown in FIGS. 4A and 4B, in the internal structure of the living organ model 20, a large number of nodes 21 are connected to each other by the connecting lines 22 and set in a restrained state, and each node 21 is arranged in a three-dimensional space. Accordingly, this living organ model 20 is drawn as a structural body of three-dimensional polygons.

All of the nodes 21 are numbered as nodes belonging to each polygon, and these node numbers and the spatial position coordinates of these nodes are managed in the system. This polygon data is stored in the data storage unit 7 of the WS 2.

Although triangular polygons are used in the description to be presented later, square polygons are used in FIGS. 4A and 4B for the sake of simplicity.

The living organ model 20 can be deformed by moving these nodes 21.

The connecting lines 22 connecting the nodes 21 are kept restrained unless an instruction for cutting the connections is issued. When the spatial positions of the nodes 21 change from their original positions due to the absence of this restraint when the living organ model 20 is subjected to incision, the living organ model 20 is deformed.

Furthermore, this connecting line 22 has elasticity information and is registered as a material such as a spring in the system.

Accordingly, the properties of the living organ model 20 can be changed by dynamically changing the operations of the nodes 21 by changing the spring constants of the connecting lines 22.

Also, most motions of common objects existing in the natural world can be equivalently and mathematically described by spring-elasticity models. Therefore, if parameters of the elasticity of an actual tissue are known, it is possible to equivalently match this spring constant and thereby match the characteristic features of the living organ model 20 in simulation to the characteristic features of an actual organ.

FIG. 5 is an enlarged view of an incised portion of the living organ model 20.

Reference numeral 30 denotes an operating tool for operating a living organ model; 21a, a node formed on the living organ model 20, located closest to the end portion of the operating tool 30, and selected from the nodes on the living organ model 20 which have a predetermined distance from the position of the operation tool 30; 22a, 22b, and 22c, nodes newly formed to produce an incised portion in the living organ model 20 by incision; and 32, a plane prepared by software to check the direction of the end portion of the operating tool 30 during incision. The plane 32 is determined by a direction which contains the end portion of the operating tool 30 and along which the operator intends to incise a portion. More specifically, when the knife of the operating tool 30 is expressed two-dimensionally, a plane containing the plane of the knife, or a plane containing the locus of the operating tool 30 operated by the operator is preferable. In the following description, this plane is explained as a plane containing the plane of the knife of the operating tool 30 and determined by the operation of the force displays 3.

Note that the plane 32 is actually invisible because it is not drawn by computer graphics.

Operation and incision of the living organ model 20 are started when the living organ model 20 and the operating tool 30 come in contact with each other.

Similar to the living organ model 20, the operating tool 30 is drawn by three-dimensional polygons and has nodes as control points of these polygons.

Accordingly, determination of contact between the living organ model 20 and the operating tool 30 is performed as shown in FIG. 6. That is, control spaces are set for the node 21 of the living organ model 20 and a node 31 of the operating tool 30. When the two control spaces overlap each other, the contact determination circuit 13 determines that the two nodes have come into contact with each other.

Figure 7:
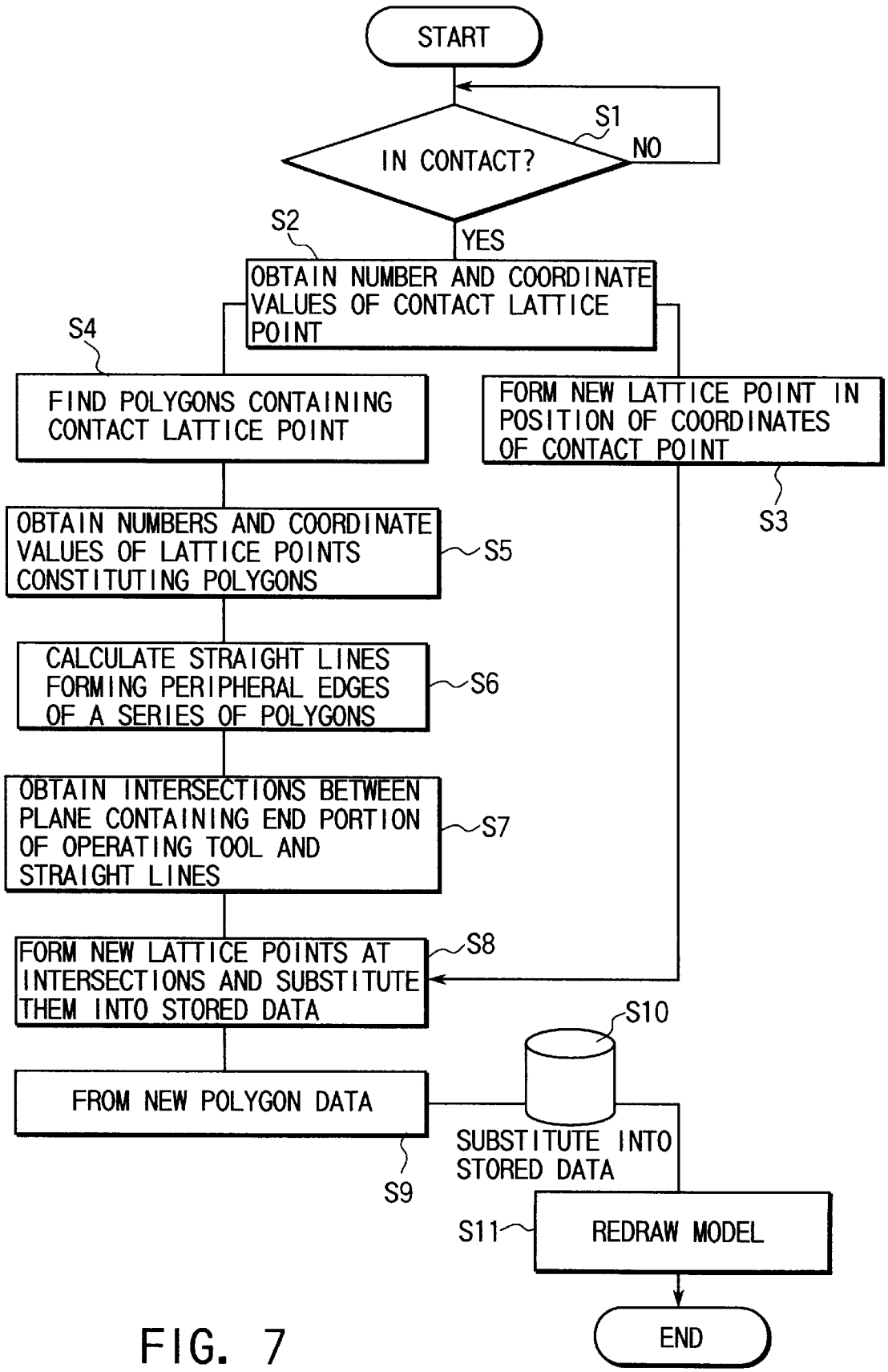
FIG. 7 is a flow chart showing the flow of incision in the medical simulation system according to the embodiment of the present invention.

The procedure of incision of the living organ model 20 will be described below with reference to the flow chart in FIG. 7.

First, as described above, the contact determination circuit 13 performs determination of contact between the node 21 of the living organ model 20 and the node 31 at the end portion of the operating tool 30 (step S1).

When it is determined that the two nodes are in contact with each other, the lattice number of the contact node is output from the contact determination circuit 13 to the control circuit 12. The number and spatial coordinates of the contact node 21a of the living organ model 20 are output from the data storage unit 7 in the WS 2 on the basis of the output lattice number (step S2).

The node formation circuit 14 duplicates the contact node 21a of the living organ model 20 with respect to the operating tool 30.

That is, the node formation circuit 14 forms a new node 22a at a coordinate point located near the contact node 21a but slightly separated on the positive or negative side to be described later (step S3).

Meanwhile, polygons having the contact node 21a in contact with the operating tool 30 as a control point (since each polygon is a triangle in this embodiment, six polygons contain the contact node 21a before incision) are output from the data storage unit 7 in the WS 2 to the control circuit 12 (step S4).

Subsequently, the numbers and coordinate values of the nodes 21 constituting the polygons found in step S4 are output from the data storage unit 7 in the WS 2 to the control circuit 12 (step S5).

On the basis of the coordinate values of the nodes 21 obtained in step S5, straight lines forming the peripheral edges of the polygons having the contact node 21a as a control point are calculated (step S6).

Polygons are triangles in this system, and a total of six polygons exist around the contact node 21a as shown in FIG. 5.

That is, the number of nodes 21 existing around the contact node 21a is also six. Therefore, six straight lines are calculated by sequentially connecting these nodes so as to form a hexagon centered around the contact node 21a.

Subsequently, the coordinates of the intersections between the six straight lines and the plane 32, which contains the end portion of the operating tool 30 and extends along the direction of the end portion of the operating tool 30, are calculated from equations representing these straight lines and an equation of the plane 32.

The node formation circuit 14 forms two new nodes 22b and 22c, of the calculated node coordinates, at two node coordinates contained in six line segments constituting a hexagon around the node 21a (step S7).

By the processing up to this point, the coordinates of all of the nodes, i.e., the nodes before incision plus the new nodes, for forming new polygons are prepared in the control circuit 12. These coordinates are input as node data to the data storage unit 7 in the WS 2 (step S8).

On the basis of this new polygon data, polygons are repasted by a method to be described below (step S9).

Figure 8:
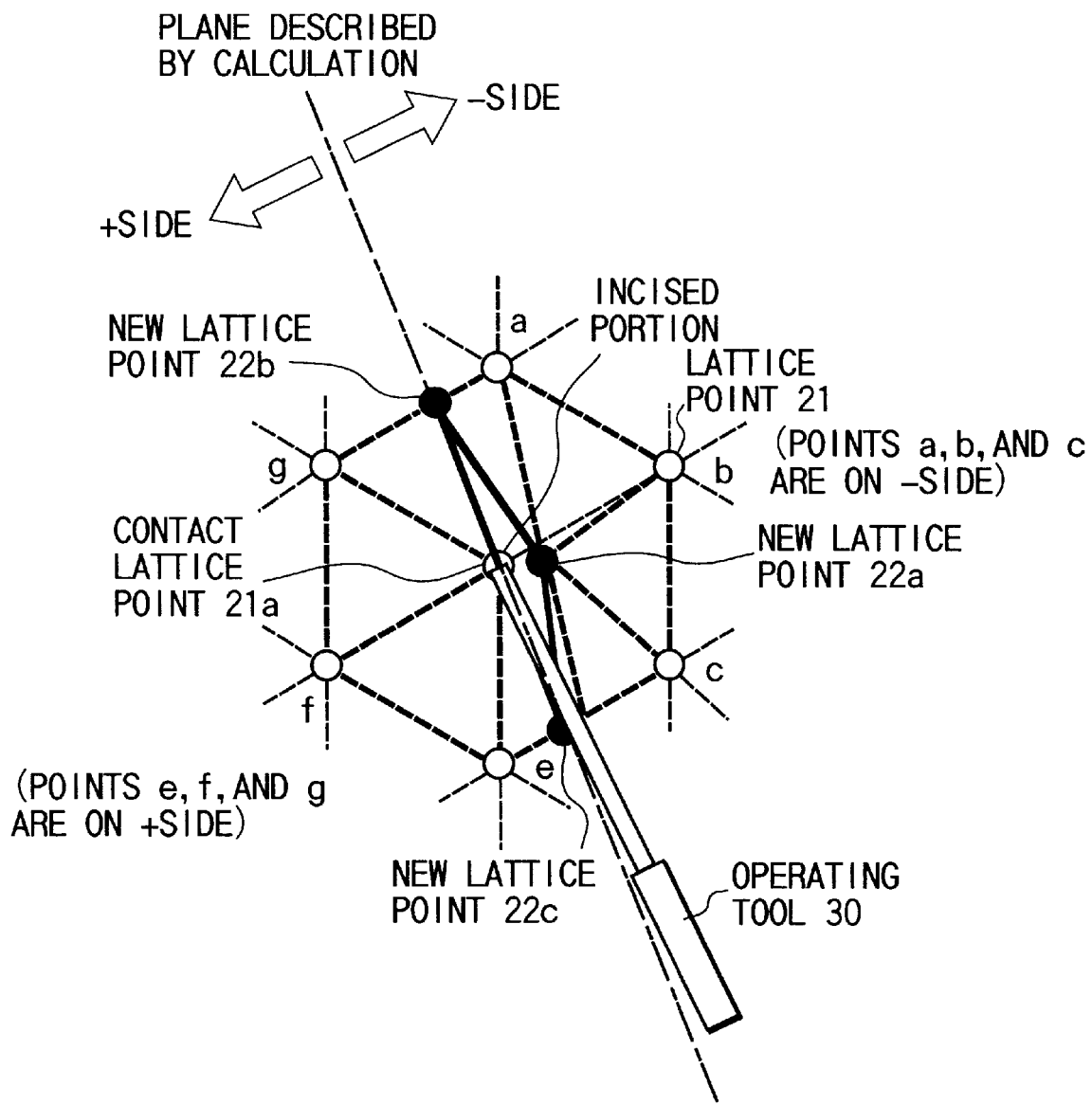
FIG. 8 is a view for explaining a general idea of repasting of polygons after the living organ model is incised in the embodiment of the present invention.

With reference to FIG. 8, polygons are repasted under the control of the control circuit 12 by using the new nodes 22a, 22b, and 22c obtained in step S9 will be described below.

In this embodiment, each polygon is formed by connecting three nodes by connecting lines. In repasting polygons, nodes to be connected are different from those before incision because it is necessary to express an incised portion.

First, nodes are classified into two groups in accordance with the side of the plane 32, also used in step S7, on which each node exists.

The plane 32 containing the end portion of the operating tool 30 and extending along the direction in which the end portion points is usually divided into two regions each containing three out of six nodes at the apexes of the hexagon centered around the contact node 21a.

The six nodes existing around the new node 21a before incision are divided into two groups bounded by the plane 32. A space to which nodes a, b, and c in FIG. 8 belong is called a negative (−) side, whereas a space to which nodes e, f, and g belong is called a positive (+) side.

Also, the contact node 21a and the new node 22a formed by duplicating the contact node 21a are necessarily separated to the +side and the −side such as shown in FIG. 8 in which the contact node 21a is on the +side and the new node 22a is on the −side.

Furthermore, the new nodes 22b and 22c are positioned on the boundary plane 32 and exist across regions on both sides.

Since the new nodes 22b and 22c existing on both sides are counted, ten nodes can be classified into two groups each containing six points. Therefore, a combination for repasting polygons is calculated for each group in the control circuit 12 to form new polygon data (step S9).

Subsequently, the node numbers (node numbers belonging to each polygon) of the polygon data in the data storage unit 7 are rewritten on the basis of the new polygon data formed in step S9 (step S10).

On the basis of this new polygon data, the living organ model 20 is redrawn under the control of the control circuit 12 (step S11).

In the living organ model 20 thus redrawn, the contact node 21a and the new node 22a are restrained by connecting them to other nodes in the respective regions by the connecting lines 22 having elasticity information. However, the contact node 21a and the new node 22a adjacent to each other are not mutually connected. Consequently, a space is formed as an incised portion between these nodes.

In this embodiment, the numbers and spatial coordinates of nodes belonging to each polygon are managed for each polygon. Therefore, even when the living organ model 20 is to be incised in an arbitrary position, it is only necessary to perform simple processing of rewriting some polygons around the contact node 22a, and drawing in real time is also possible. This gives reality to motion of the living organ model 20 in a surgery simulation system.

Also, in this embodiment, in the formation of a new node the direction in which the operating tool 30 comes in contact with the living organ model is taken into account by using the plane 32. Accordingly, when the operating tool 30 is a scalpel for performing incision, for example, the incision of a model can be faithfully drawn in accordance with the motion of the scalpel.

The model expression method of this embodiment is effective in all portions of the living organ model 20.

Furthermore, even when the operating tool 30 is moved, the incised portion can be deformed with simple processing by sequentially repeating the procedures described above.

That is, in the model expression method of this embodiment, even when an organ model is incised in an arbitrary portion with an arbitrary size, the incisional range can be widened following the movement of the operating tool 30. Consequently, the deformation of the organ model can be drawn in real time as in the case of an actual organ.

Although this embodiment has been explained by using triangular polygons, the shape of polygons is not limited to a triangle. That is, the present invention can be applied to some other shape such as a square as shown in FIGS. 4A and 4B.

This embodiment has been explained by taking medical surgery simulation as an example. However, the present invention is not limited to this application. For example, the present invention is applicable to any model expressed by using polygons on computer graphics, such as cutting of fruit.

As has been described in detail above, the present invention can provide a simulation system using computer graphics and a model expression method capable of giving reality to the deformation of a model described by using polygons.

Additional embodiments of the present invention will be apparent to those skilled in the art from consideration of the specification and practice of the present invention disclosed herein. It is intended that the specification and examples be considered as exemplary only, with the true scope of the present invention being indicated by the following claims.

We claim:

1. A simulation system based on computer graphics using a model expressed by polygons which are polygonal planes constituted by a plurality of nodes and a plurality of connecting lines for connecting the nodes, comprising:

means for drawing an operating tool for performing an operation for said model;

detecting means for calculating a distance between an end portion of said operating tool drawn by said drawing means and the node constituting said model and detecting that the end position of said operating tool is located within a predetermined distance; and first node generating means for receiving an output from said determining means and generating a node near a given node having a predetermined distance from said operating tool so as not to be connected to the given node.

2. A system according to claim 1, further comprising:

second node generating means for generating nodes at intersections between a polygon constituted by a plurality of nodes around the given node having the predetermined distance from said operating tool and a predetermined plane containing the end portion of said operating tool; and means for generating connecting lines for connecting the nodes generated by said second node generating means and the nodes constituting the polygon and connecting lines for connecting the nodes generated by said second node generating means and the node generated by said first node generating means.

3. A system according to claim 2, wherein said operating tool drawing means is controlled by a controller operated by an operator, and the predetermined plane is defined by a direction of said operating tool which is represented by said controller.

4. A system according to claim 2, wherein said operating tool drawing means is controlled by a controller operated by an operator, and the predetermined plane is defined by a locus of movement of said operating tool which is represented by said controller.

5. A system according to claim 2, wherein said connecting line generating means comprises means for generating elasticity information of the connecting lines.

6. A model expression method based on computer graphics using a model expressed by polygons which are polygonal planes constituted by a plurality of nodes and a plurality of connecting lines for connecting the nodes, comprising:

a step of drawing an operating tool for performing an operation for said model;

a detecting step of calculating a distance between an end portion of said operating tool and the node constituting said model and detecting that the end position of said operating tool is located within a predetermined distance; and a first node generating step of generating a node near a given node having a predetermined distance from said operating tool so as not to be connected to the given node on the basis of a determination result in the determining step.

7. A method according to claim 6, further comprising:

a second node generating step of generating nodes at intersections between a polygon constituted by a plurality of nodes around the given node having the predetermined distance from said operating tool and a predetermined plane containing the end portion of said operating tool; and a connecting step of generating connecting lines for connecting the nodes generated in the second node generating step and the nodes constituting the polygon and connecting lines for connecting the nodes generated in the second node generating step and the node generated in the first node generating step.

* * * * *